United States Patent
Barry et al.

(10) Patent No.: US 11,806,656 B2
(45) Date of Patent: *Nov. 7, 2023

(54) FOLDING AIR FILTER ASSEMBLY AND APPARATUS

(71) Applicant: Second Nature Brands, Inc., Raleigh, NC (US)

(72) Inventors: Kevin James Barry, Raleigh, NC (US); Thaddeus Worth Tarkington, Raleigh, NC (US)

(73) Assignee: SECOND NATURE BRANDS, INC., Raleigh, NC (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/493,916

(22) Filed: Oct. 5, 2021

(65) Prior Publication Data

US 2022/0023793 A1    Jan. 27, 2022

Related U.S. Application Data

(63) Continuation of application No. 16/454,185, filed on Jun. 27, 2019, now Pat. No. 11,135,541, which is a
(Continued)

(51) Int. Cl.
*B01D 46/52* (2006.01)
*B01D 46/10* (2006.01)
*B01D 46/00* (2022.01)

(52) U.S. Cl.
CPC ....... *B01D 46/521* (2013.01); *B01D 46/0001* (2013.01); *B01D 46/103* (2013.01); *B01D 2265/04* (2013.01); *B01D 2275/203* (2013.01)

(58) Field of Classification Search
None
See application file for complete search history.

(56) References Cited

U.S. PATENT DOCUMENTS 3,624,161 A    11/1971 Bub
4,123,239 A    10/1978 Andersson et al.
(Continued)

FOREIGN PATENT DOCUMENTS

CN    201598872 U    10/2010
CN    204619609 U    9/2015
(Continued)

OTHER PUBLICATIONS

Rospatent, Office Action with Search Report for Russian Patent Application No. 2020128815, dated Jun. 30, 2022, 9 pages.
(Continued)

*Primary Examiner* — Jason M Greene
(74) *Attorney, Agent, or Firm* — NK Patent Law

(57) ABSTRACT

This document presents an apparatus for a flexible air filter media that can be configured for shipping and storage having one or more flexible inserts mounted to the filter media along one or more portions of the accordion folds of the air filter material. The current invention permits the air filter apparatus to fold along both X and Y axes, create a tri-fold, and bend in a manner that provides for a much smaller volume for shipping purposes. The invention also permits attaching the flexible material to the center of the filter media and also inserts which allow sections of the air filter media to be nested one into another to reduce both shipping and storage volume.

18 Claims, 9 Drawing Sheets

Related U.S. Application Data continuation of application No. 15/251,218, filed on Aug. 30, 2016, now Pat. No. 10,350,533.

(56) References Cited

U.S. PATENT DOCUMENTS

| | | | |
|---|---|---|---|
| 5,230,799 A | | 7/1993 | Willard et al. |
| 5,797,975 A | | 8/1998 | Davis |
| 6,221,120 B1 | * | 4/2001 | Bennington ............ B01D 46/10 55/525 |
| 6,533,835 B2 | | 3/2003 | Wilson et al. |
| 10,940,416 B2 | | 3/2021 | Gregerson et al. |
| 11,135,541 B2 | * | 10/2021 | Barry .................. B01D 46/521 |
| 2008/0115475 A1 | * | 5/2008 | Sandberg ............... B01D 46/10 55/507 |
| 2009/0019824 A1 | * | 1/2009 | Lawrence .............. B01D 46/10 55/497 |
| 2009/0320426 A1 | | 12/2009 | Braunecker et al. |
| 2010/0229513 A1 | | 9/2010 | Eisengraeber-Pabst et al. |
| 2012/0227366 A1 | | 9/2012 | Aycock |
| 2015/0117030 A1 | | 4/2015 | Pilby |
| 2017/0312678 A1 | | 11/2017 | Elliott |
| 2017/0320525 A1 | | 11/2017 | Hall et al. |
| 2017/0348624 A1 | | 12/2017 | Do |

FOREIGN PATENT DOCUMENTS

| | | |
|---|---|---|
| EP | 0651210 A2 | 5/1995 |
| JP | 2007038191 A | 2/2007 |
| RU | 2641818 C2 | 1/2018 |
| WO | 2005074468 A2 | 8/2005 |
| WO | 2009096984 A1 | 8/2009 |

OTHER PUBLICATIONS

CNIPA, Third Office Action for Chinese Patent Application No. 201980028808.1, dated Jul. 21, 2022, 15 pages.

EPO, Office Action for European Patent Application No. 19761230.2, dated Jul. 29, 2022, 3 pages.

* cited by examiner

FOLDING AIR FILTER ASSEMBLY AND APPARATUS

CROSS-REFERENCE TO RELATED APPLICATIONS

This application is a continuation application of U.S. patent application Ser. No. 16/454,185, issuing as U.S. Pat. No. 11,135,541 on Oct. 5, 2021, entitled "Folding Air Filter Assembly and Apparatus", filed on Jun. 27, 2019, which is a continuation of U.S. patent application Ser. No. 15/251,218, now U.S. Pat. No. 10,350,533 issued on Jul. 16, 2019, entitled "FOLDING AIR FILTER ASSEMBLY AND APPARATUS", filed on Aug. 30, 2016, the contents of which are all incorporated by referenced herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Air filters to date often are designed in a very rigid configuration that is useful for being inserted in structures that are a predetermined size. Consumers have to purchase various filters that fit particular size openings within the specified structure. Society has depended on ensuring that the air filter dimensions conform to the size of whatever opening will be used along with the air filter. These norms and methods along with their expense have not changed much with regard to design and application. The previous methods have primarily utilized an abundance of rigid components and other devices for creating an effective fit between the air filter and structures into which they are to be inserted. Additionally, the conventional use of such systems do not allowed for any flexibility or interchangeability. Makers of air filters have attempted to develop a network of air filter sizes to supply an infinite number of external structures without a universal size. This has lead to the expense and need for consumers to purchase various sizes and types of air filters that can be a challenge for consumers to manage. Conventional methods have not been very desirable among consumers due to challenges associated with the expense of purchasing filters of the incorrect size.

Although the purchase of air filters is a necessity, eliminating the need to go to a store and purchase air filters as a service can provide greater convenience at a reasonable cost for each consumer.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
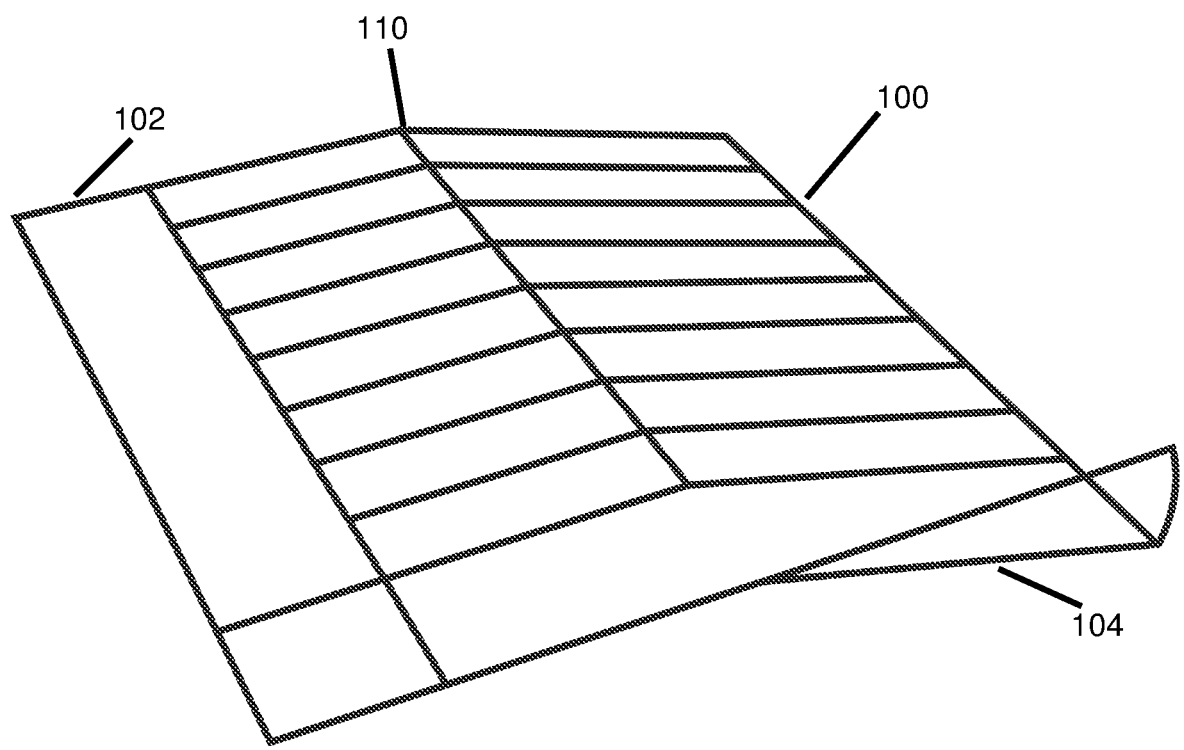
FIG. 1 is a perspective view of a flexed filter media consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a "seal", shall refer to the material that surrounds the exterior edges of the filter to prevent air from traveling around the filtration matrix material of the filter.

Air filters are used in a number of devices for commercial and private use. By way of example, air filters may be found in use in:

airports
Department of transportation (tunnels)
Public transportation (train stations)
Public Schools k-12
Public and private universities
Pre schools/daycare Nursing homes
Manufacturing facilities
Car rental locations
Supermarkets
Hair salons
Auto dealerships
Furniture stores
Jewelry stores
Banks
Storage units
Auto parts
Big box/Malls/strip malls
Gyms
Restaurants
   Chains
   Clubs
Hotels
Homes
Mobile homes
Apartments
Condominiums
Commercial offices
Commercial flex space One of the most fundamental purposes of the filter for any user is to assist in cleaning air, which includes straining and removing particulates in the airstream, used in confined areas. From a commercial and residential perspective it is an important attribute for an air filter to be able to be utilized in various configurations and shipped to the end user utilizing different methods of storage and delivery.

Providing air filters to an end user may take into account the sizes and types of air filters each customer needs, providing customers with the right filters for their HVAC systems. Shipping filters to each client, however, can be difficult because of the cubic volume of the filters. If air filters could be reduced in size without impairing the function of the air filter, the shipping efficiencies could be significant. Permitting a filter to fold, bend, or compress into a smaller form factor may alleviate shipping and storage issues by taking advantage of a reduced number of both shipping and storing containers due to the fact that items can be configured to occupy a smaller cubic volume during shipping and storage. Due to the fact that shipping charges are often assessed by the volume of the items being shipped, having a common, smaller volume presents an opportunity to maximize the number of items being shipped for a particular charge by a shipping company.

Generally, air filters do not utilize components to allow for bending or configuring the air filter into a smaller physical volume. The existing configuration of air filters are designed for standard use for specific external components. For instance, when a home owner needs to change their air filter in their residence then they must purchase a filter which most likely has a rigid dimension that typically is bordered with a seal that forms the exterior edge of the air filter and that may be composed of metal, cardboard, chipboard, plastic, or other materials that are not flexible in nature. In a non limiting example, because these traditional air filters are not flexible a user will need to purchase a filter with exact dimensions and when the filter is shipped to the customer or retailer it must be shipped in accordance with those external dimensions. This requirement means that the air filter manufacturer, supplier, distributor, or reseller cannot take advantage of lower shipping rates for items having a smaller volume or physical configuration because bending the rigid seal of an air filter to achieve a smaller volume is not possible.

The proposed invention as outlined is an extension air filter that allows for greater flexibility of air filter physical configuration, usability, and cost efficiency by creating extension air filters that may be configured to fit in a smaller volume, or can bend and flex to a sufficient degree to take advantage of lower shipping rates while retaining the ability to be expanded to one or more standard air filter sizes when received by a consumer. In an alternative embodiment, it is also desirable to manufacture and ship air filters that may fit a number of applications or physical structures without having to repurchase additional filters. The disclosed embodiments include various physical configurations which allow for additional freight, shipping, and logistics options for the expansion air filter.

In an exemplary embodiment, an air filter may be created to have flexible attributes to allow the user to bend the filter media along both the X and Y axis to permit the air filter to be configured in a smaller volume, and provide for flexion in the X and Y axes to take advantage of current shipping rules that provide lower rates for items that may flex or be shipped in smaller volume containers. The current challenge for bending and/or flexing the air filter and air filter media is one of dealing with rigid structures. Generally, air filters currently available may be bent along the X axis or along the Y axis, but may not be bent in both an X and Y axis without damaging the air filter sufficiently that it is no longer suitable for the use for which it was intended.

In an exemplary embodiment, the instant air filter apparatus solves the problem of bending in X and Y axes simultaneously to permit the air filter to both be configured in a smaller physical volume, and to increase flexibility capabilities along the shaped and folded air filter matrix, such as being formed into accordion folds, that enhances the capability of the air filter to flex without damage. To elaborate, having flexibility attributable to various axis points along the shaped and folded air filter matrix presents a manufacturer, supplier, distributor, or reseller with the ability to bend the air filter, and/or permit the air filters to flex, without damage to the air filter matrix material, when shipped to the user. In this exemplary embodiment, the contribution of other flexible material inserted within the air filter material provides a structure that permits much greater bending capability along the flexible material inserts such that the air filter matrix does not suffer damage when the folded air filter is unfolded and ready to install in a customer location. In a non-limiting example, the instant air filter may utilize a flexible material insert to increase the fold and flex capability of the air filter without damaging the air filter matrix material. Various configurations of flexible material inserts may be contemplated. In a non-limiting example, a single insert may be added so as to permit folding action to fold the air filter along a single axis, creating a filter half the volume of the original air filter prior to shipping. In another non-limiting example, an insert shaped in the form of a cross may be added to permit folding action along both the X and Y axes simultaneously, creating a filter a quarter of the volume of the original air filter prior to shipping. In another non-limiting example, two inserts may be added either along the X axis or along the Y axis in such a position so as to permit a tri-fold configuration, creating a filter a third of the volume of the original filter prior to shipping.

In an embodiment, the air filter apparatus may connect the air filter matrix material to a more flexible material, such as cloth, woven matting, flexible plastic, neoprene, mylar, rubberized flexible material, woven metal mesh, or other like materials that may form the flexible material insert. In a non-limiting embodiment, the insert material may be connected or bonded to the air filter matrix material through the use of adhesive materials, clamps, stitching, or any other method that creates a secure connection between the flexible material insert and the air filter matrix material. The bonding connection is a key factor where the user requires a bend for a variety of purposes such as shipping and storage of the filter. If the bonding connection is applied correctly the air filter, hereinafter the extension air filter, may bend and fold to meet a number of applications, such as providing flexion, creating multiple folds to compress the extension air filter to permit the folded filter to be inserted into smaller configurations. Additionally, the flexible material inserts may provide for extension in the X and Y directions to expand the exterior dimensions, or contract the exterior dimensions, of the air filter assembly to permit closure of any gaps between the exterior edge of the air filter and the housing into which the air filter assembly is to be inserted once it has been fully unfolded. This extension permits a user to close gaps to correct the seal between the air filter assembly and air filter housing and stop unfiltered air from getting by the air filter assembly.

In an exemplary embodiment, the extension air filter application uses various attachments such as compression clamps, inserts, flexible material, and bonding materials to improve flexibility as well as interchangeability. As previously mentioned, if the user properly uses the method of attaching these components and folding the filter media along the X and Y axis points, the extension air filter will be useful for a both folding into smaller configurations and provide general cost savings when shipping freight and shelf space is at a premium.

In a non-limiting example, the extension air filter may be useful in situations where a certain dimension is required for shipment. To elaborate, the United States Postal Service (USPS) requires parcels to pass a "Flex test" which mandates specified width and length specifications. The extension air filter is ideal for such a situation in that components such as the expansion panels and a flexible seal edge allow commercial users to meet these requirements by not jeopardizing any design configurations for their end users.

In an embodiment, the air filter assembly may have an exterior seal conforming to the exterior edges of the air filter matrix portions and the flexible material inserts such that the exterior seal forms the exterior edge of the air filter assembly. The exterior seal may be constructed from flexible materials such as rubber, malleable plastics, mylar, or any other polymer or resin having a high flexibility quotient. The exterior seal may also be formed as a hollow chamber, such as a tube or other shaped structure having a hollow interior, into which air, expandable foam, metal, or liquid may be inserted to provide for greater structural strength when the hollow portion of the exterior seal is filled.

Turning now to FIG. 1, this figure presents a view of the air filter media 100 to include several accordion folds consistent with certain embodiments of the present invention. In an exemplary embodiment, the flexible insert material 102 is connected along one or more edges of the air filter media 100. The flexible insert material 102 may flex along the edges of the inserts as indicated 104. The air filter material 100, which may consist of filter material configured in an accordion fold 110 may be attached to the flexible insert material 102 through the use of one or more bonding methods as previously described. The flex capability of the flexible insert material 102 may be selected to meet the criteria of one or more shipping providers. The material may, in a non-limiting example, flex 104 approximately 2 inches or more without damage to the air filter media 100 to meet shipping criteria for flexion.

Figure 2:
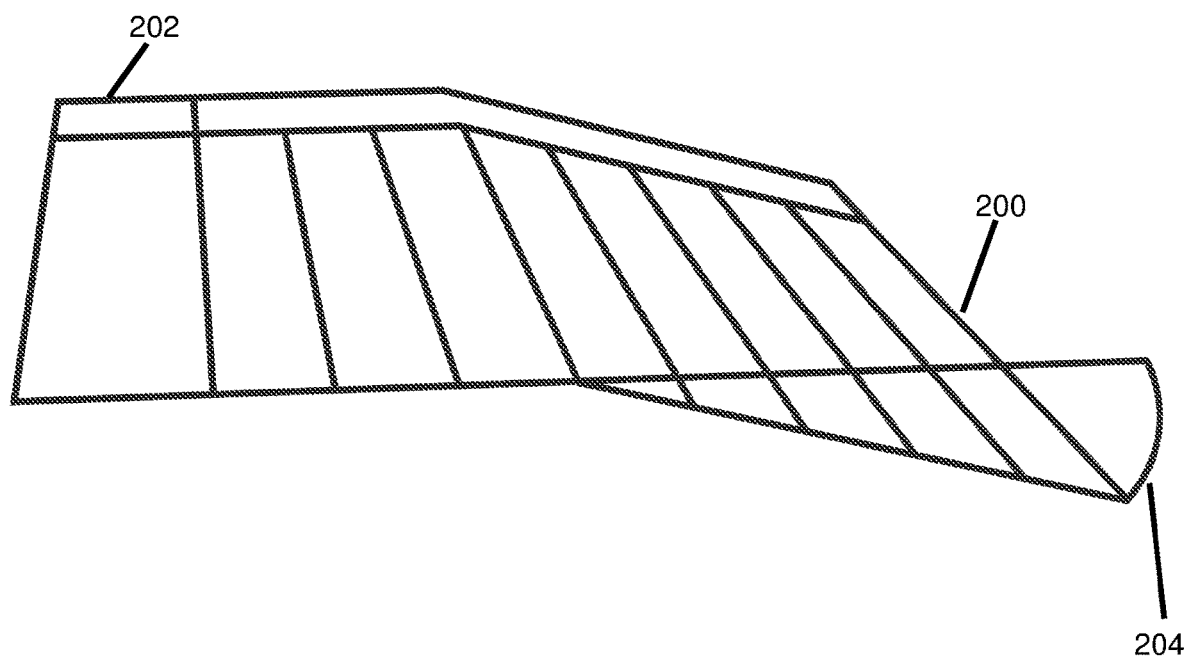
FIG. 2 is an alternate perspective view of a flexed filter media consistent with certain embodiments of the present invention.

Turning now to FIG. 2, this figure presents a view of a flexed filter media bonded to the accordion folds comprising the extension air filter matrix material consistent with certain embodiments of the present invention. In an exemplary embodiment, the air filter media 200, which is commonly formed in accordion folds, may also flex to permit the air filter to flex and bend along both X and Y axis with minimal or no damage to the air filter media 200. In this exemplary embodiment, the flexible insert material 202 may be bonded to the side of the air filter media 200 that is opposite to the side of the air filter that is being flexed 204. The capabilities of the air filter material 200 to bend and flex adds additional flexibility to permit the air filter to meet the expressed criteria of one or more shipping providers.

Figure 3:
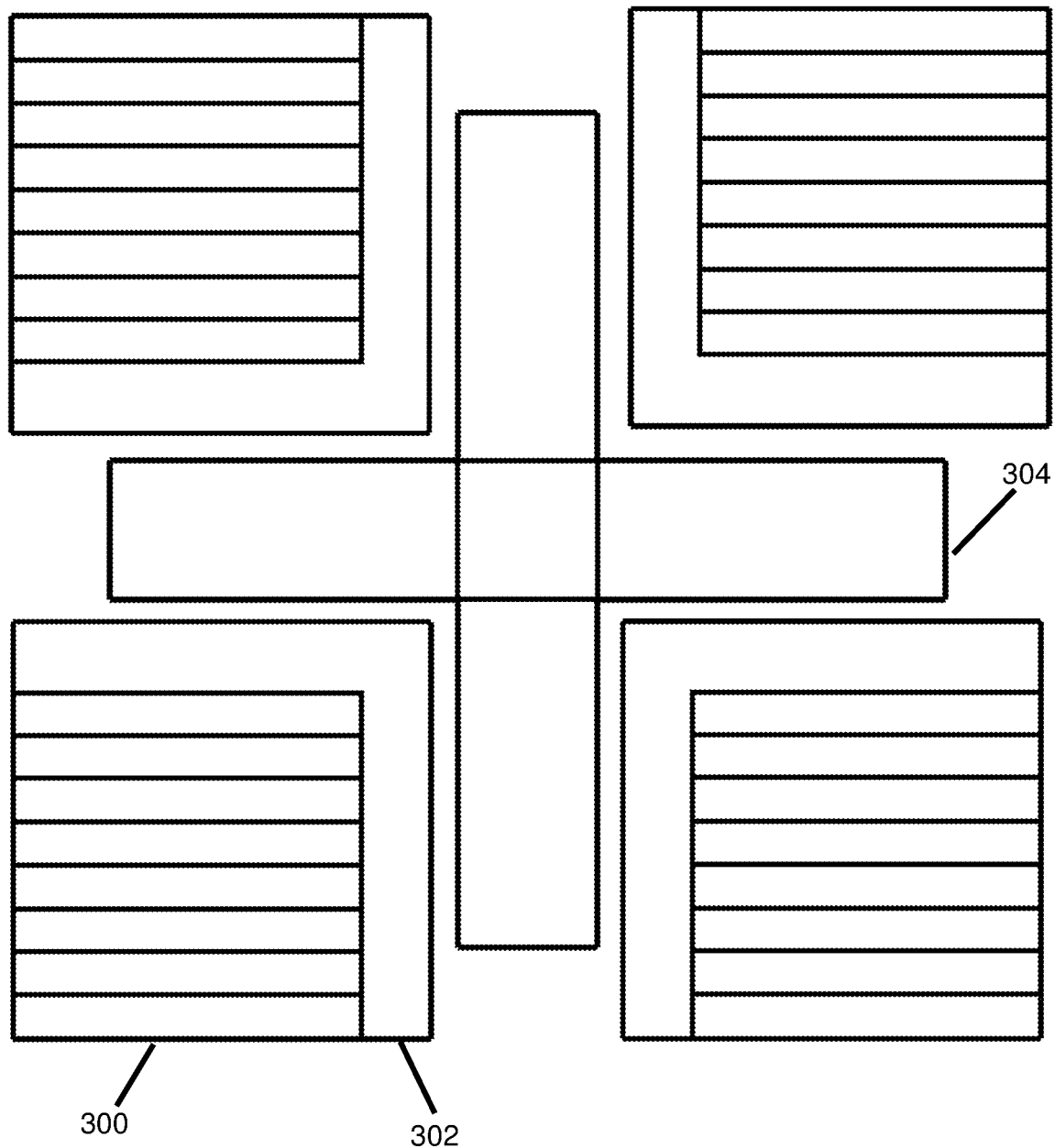
FIG. 3 is an elevated view of the air filter media consistent with certain embodiments of the present invention.

Turning now to FIG. 3, this figure presents a view of a separate flexible insert material bonded to the air filter media consistent with certain embodiments of the invention. In this exemplary embodiment, the air filter media 300 comprises a plurality of panels that may each have a portion of one or more flexible insert materials 302 that are disposed along the sides forming the inner connection sides of the air filter when all panels are connected to the center flexible insert material 304. The center flexible insert material 304 may be attached to the flexible insert material portions 302 disposed along the inner edges of the air filter media panels 300 by various attachment materials or apparatus as previously described and consistent with certain embodiments of the present invention. In this exemplary embodiment, the center flexible insert 304 adds a flexible element to the air filter by permitting bending along either the X or Y axis either before or after the accordion fold material of the air filter media panels 300 have been fully compressed. During folding operations, prior to shipment of the air filter, once the accordion folds of the air filter media panels 300 have been compressed, the flexible insert 304 may bend to form a much smaller volume for shipment, and permit the air filter to be reformed to its original size and shape without damage to the air filter media panels 300. Upon unfolding the air filter, the air filter may be installed and used for its intended purpose without harm to the air filter and still provide effective air filtration by the air filter media panels 300.

Figure 4:
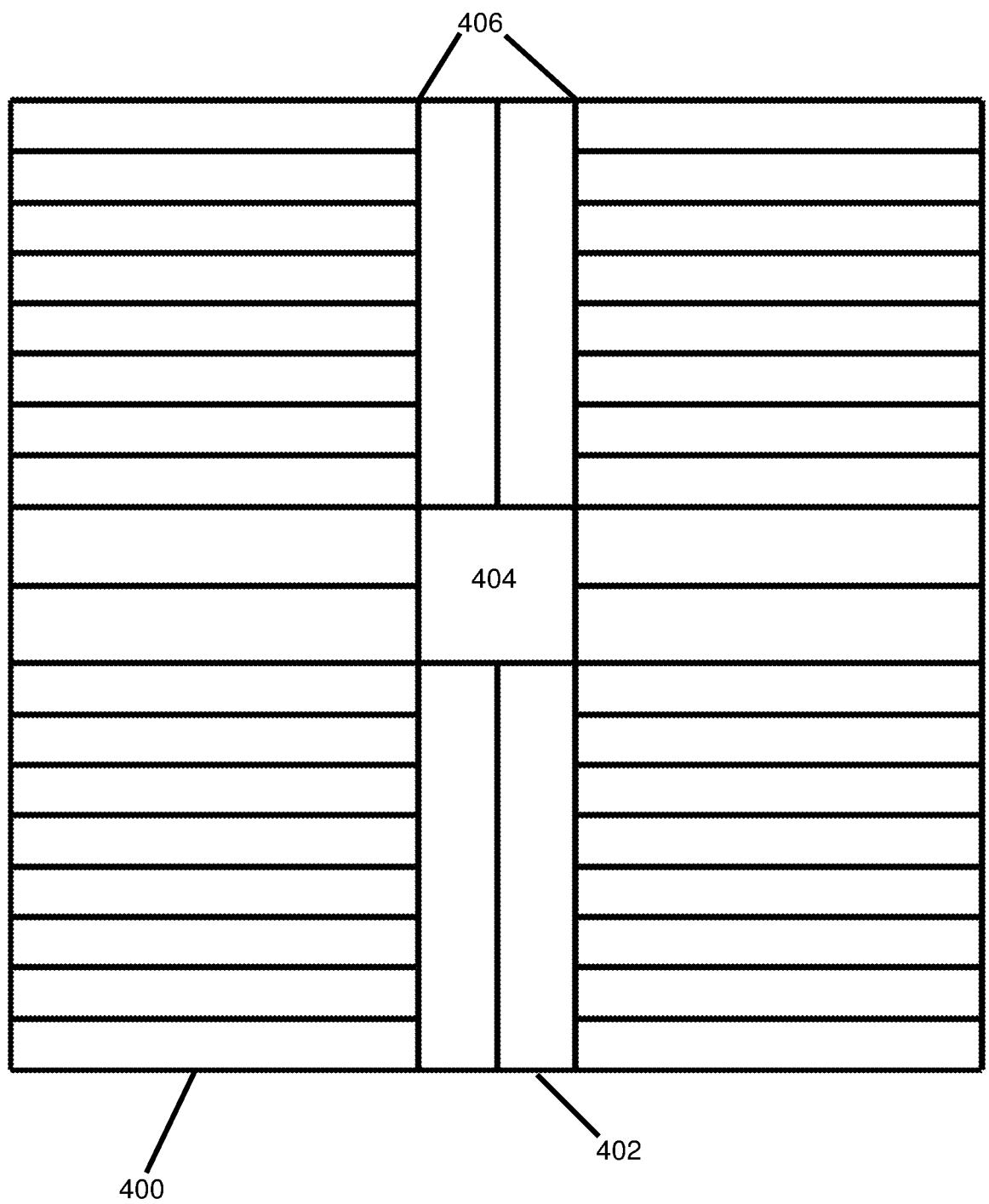
FIG. 4 is a view of the air filter assembled consistent with certain embodiments of the present invention.

Turning now to FIG. 4, this figure presents a view of a fully assembled structure for the current invention to include the filter media and the separate flexible insert material consistent with certain embodiments of the present invention. In an exemplary embodiment, the air filter media panels 400 may be bonded together by attaching the flexible material side portions 402 to the separate flexible material panel 404. In a non-limiting example, the flexible material side portions 402 and the separate flexible material panel 404 may be configured such that the center portion of the air filter is formed as an overlayment of the separate flexible material panel 404 and the flexible material side portions, forming a secure bond. This bond may be the result of various attachment methods, including, but not limited to, adhesive materials, stitching, clamping, stapling, fusing, or any other method for permanently bonding two flexible materials to one another. Once the flexible material panels have been bonded to one another, the flexible material insert 406 becomes the mechanism along which the air filter may be folded along the X and Y axes to permit this configuration of air filter material panels 400 and the flexible material insert 406 to be folded to one quarter of the fully extended size of the air filter. Upon completion of the bonding step, the air filter is able to flex and bend to create smaller configurations for shipping and other purposes, where such other purposes may include high density packaging and storage where condensing the air filter permits a larger number of air filters to be packed within a particular volume of packaging or permits a larger number of air filters to be placed within a given volume on a retail store shelf.

Figure 5:
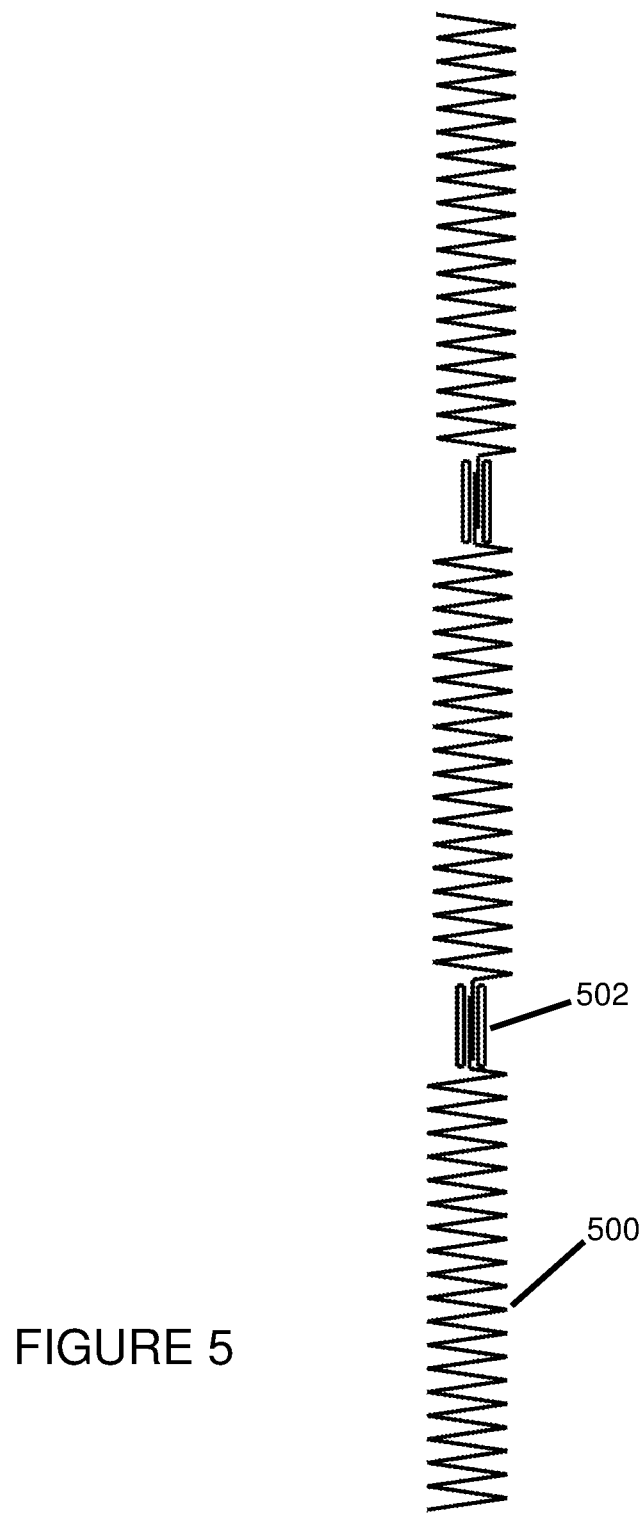
FIG. 5 is a cross-sectional view of three air filter panels bonded to flexible material inserts consistent with certain embodiments of the present invention.

Turning now to FIG. 5, this figure presents a side view of an alternative tri-fold configuration for the air filter certain embodiments of the present invention. In an embodiment, air filter material panels 500, composed most commonly, although not exclusively, of accordion folded air filter material, may be bonded to flexible material portions 502 along one or more edges of the air filter material panels 500.

In this embodiment, larger air filters may have difficulty meeting shipping regulations for sizes that receive the most preferential shipping rates. In a non-limiting example, when mailing air filters through the United States Postal Service (USPS) shipping service air filters larger than 15 inches long, 12 inches high and 0.75 inches thick incur higher shipping charges than air filters smaller than these dimensions. Additionally, a flex test is required by first class mail which stipulates that a parcel must be able to flex up to 2 inches on a side. By inserting two flexible material portions 502 at points between equal sized air filter material panels 500, an air filter having dimensions larger than those preferred by the USPS may be folded at the positions where the flexible material portions 502 are bonded to the air filter material panels 500 to a smaller configuration. The air filter material panels 500 may be sized, in a non-limiting example, such that when folded at the flexible material portion 502 positions, the shipping size of the folded air filter is within the size requirements of the USPS for preferential shipping rates.

Figure 6:
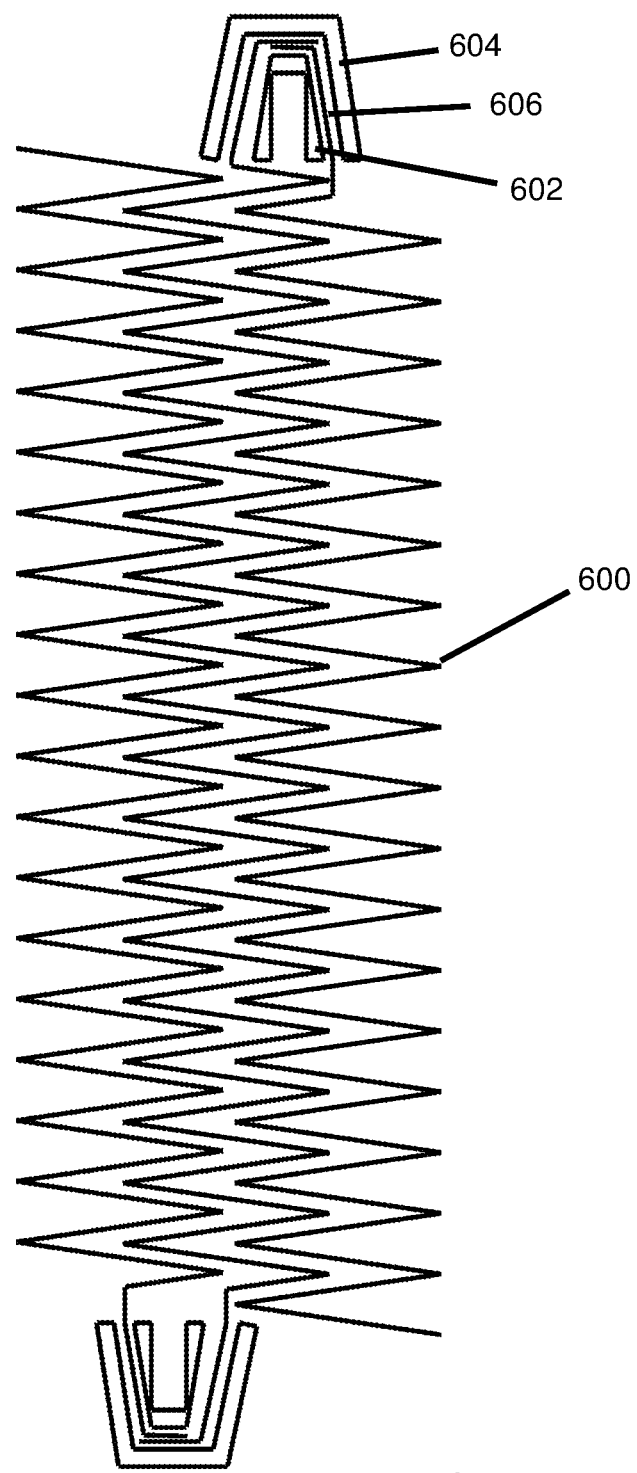
FIG. 6 is a cross-sectional view of a tri-folded, nested air filter panel assembly consistent with certain embodiments of the present invention.

Turning now to FIG. 6, this figure presents a side view of an air filter fully folded consistent with certain embodiments of the present invention. In an exemplary embodiment, a plurality of air filter media panels 600 may be attach or bonded to separate flexible insert material portions 602. The separate flexible insert material portions 602 may be attached to, or formed as part of, one or more of the edges of the air filter media panels 600. In this exemplary embodiment, the separate flexible insert material portions 602 may be bonded together using adhesive materials, stitching, clamping, stapling, fusing, or any other method for permanently bonding two materials to one another. In this non-limiting example, an outside clamp 604 and an inside clamp 606 may be employed to bond the flexible material portions 602 to the air filter media panels 600. In this non-limiting example, the flexible material portions 602 are placed between an outside clamp 604 and an inside clamp 606. The clamps (604, 606) may then be pressed into a format that causes the edges of the clamps to be squeezed together, thereby forcibly retaining the edges of the flexible material portions 602 within the clamps.

Although this example is provided for illustration purposes, the utilization of clamps to secure the flexible material portions 602 together is just one method by which this goal may be accomplished and should in no way be considered limiting. In this exemplary embodiment, placing the flexible material portions 602 in proper relation to the air filter media panels 600 permits the air filter media panels 600 to be folded together such that the accordion folds may nest one within another, thus not only reducing the volume of the air filter, but also permitting the according folds of each panel to be pressed together into a much smaller volume without damage to the air filter media panel 600 material. When received at a client site, the air filter may be uncompressed to extend the accordion folds, and the air filter media panels 600 unfolded to return the air filter to its original size, ready for use for its intended purpose.

Figure 7:
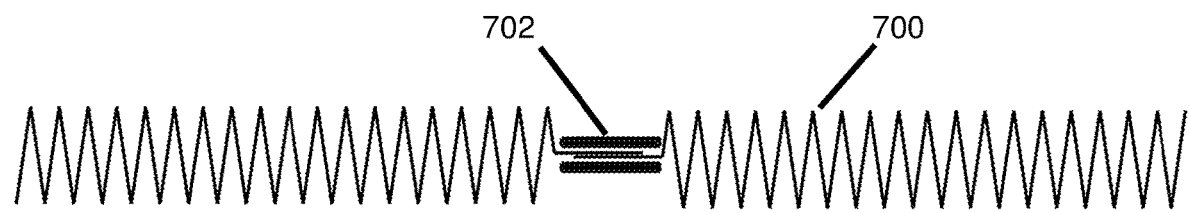
FIG. 7 is a cross-sectional view of the air filter panels bonded to flexible material inserts consistent with certain embodiments of the present invention.

Turning now to FIG. 7, this figure presents a side view of two air filter panels bonded to a flexible insert consistent with certain embodiments of the present invention. In this exemplary embodiment, the principal construction component of the air filter assembly is the bonding of two air filter media panels 700 to a flexible material insert 702. In this basic configuration, once the flexible material insert 702 is bonded to the two air filter media panels 700 in a manner such as that previously described, the air filter media panels 700 may be folded along the flexible material insert 702 to permit a reduction in the exterior dimensions of the assembly to suit both shipping and compact storage purposes.

Figure 8:
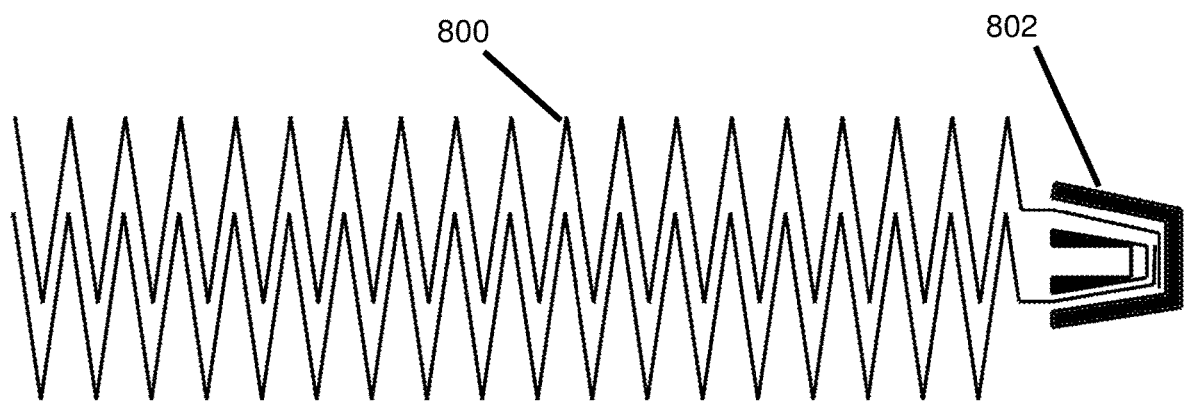
FIG. 8 is a cross-sectional view of a folded, nested air filter panel assembly consistent with certain embodiments of the present invention.

Turning now to FIG. 8, this figure presents a side view of two air filter panels fully folded consistent with certain embodiments of the present invention. In this non-limiting example, for each join of air filter media panels with a flexible insert, placing the flexible material portions 802 in proper relation to the air filter media panels 800 permits the air filter media panels 800 to be folded together such that the accordion folds may nest one within another, thus not only reducing the volume of the air filter, but also permitting the according folds of each panel to be pressed together into a much smaller volume without damage to the air filter media panel 800 material.

Regardless of the configuration of the air filter media panels 800 with the flexible inserts 802, when accordion folded air filter media is utilized, this folded configuration may be utilized to reduce and compress the size of the air filter from an initial configuration to a configuration that is more suitable to manufacturer, shipper, and client needs and uses. The air filter can expand inwards and outwards to go from N"×N"×1" to Y"×Y"×1", where N is greater than Y, and be reformed into the Y"×Y"×1" position for shipping and greater storage efficiency. When received at a client site, the air filter may be uncompressed to extend the accordion folds, and the air filter media panels 800 unfolded, expanding from the Y"×Y"×1" shipping or storage configuration to N"×N"×1", its original configuration. Additionally, the flexible material portions 802 may be extensible to permit the flexible material portions 802 to expand or contract to permit small adjustments to the exterior dimensions of the air filter when fully unfolded to permit the air filter to conform to an air filter opening. When the air filter is unfolded to its original configuration and in a position to be used, the seal will act as a rigid structure that would prevent the filter from buckling and being sucked into a vent, impairing the use of the air filter.

Figure 9:
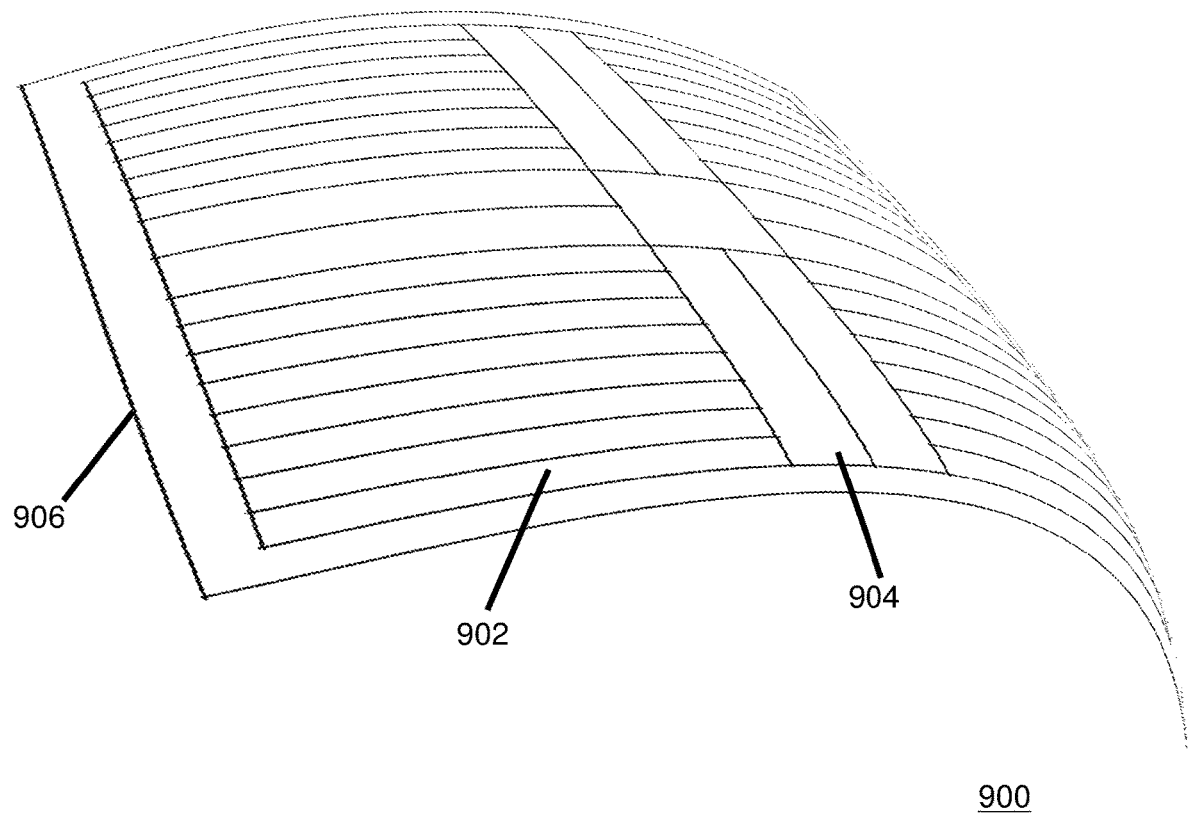
FIG. 9 is a view of an air filter panel assembly having a flexible edge seal consistent with certain embodiments of the present invention.

Turning now to FIG. 9, this figure presents a view of an air filter panel assembly having a flexible edge seal consistent with certain embodiments of the present invention. In a non-limiting embodiment an air filter assembly 900 may consist of folded or shaped air filter material panels 902 so as to permit the air filter material panels 902 to nest within one another to greatly reduce the physical dimensions of the air filter assembly 900.

In an additional embodiment, the folded or shaped air filter material panels 902 may have one or more flexible insert panels 904 interspersed between air filter material panels 902 to permit folding in multiple axes without damage to the air filter material panels 902. The air filter assembly 900 may not fold in multiple directions if the edge, border, or seal is a rigid construction. In this non-limiting embodiment, the air filter assembly 900 may have a flexible seal 906 composed along the exterior edges of the air filter assembly. The flexible seal 906 may be connected to the folded or shaped air filter material panels 902 directly, or may be connected to the folded or shaped air filter material panels 902 having one or more flexible insert panels 904. The flexible seal 906 may be constructed of a highly flexible material that will bend through 180 degrees, yet reform into the original format and shape when unfolded. The flexible seal 906 may also maintain a substantially tight seal to retain the air filter assembly 900 in position within an opening through which air will flow when an air filtration system is in operation and permitting the air filter assembly 900 to perform the air filtration function for which the air filter assembly 900 is intended.

While certain illustrative embodiments have been described, it is evident that many alternatives, modifications, permutations and variations will become apparent to those skilled in the art in light of the foregoing description.

What is claimed is:

1. An air filter apparatus, comprising:
an air filter material panel having a plurality of exterior edges; and
a plurality of flexible seals each along a respective one of the exterior edges of the air filter material panel;
wherein, by flexing the flexible seals, the air filter material panel is foldable along multiple non-parallel axes from an expanded configuration of the air filter apparatus ready for use in an HVAC system to a reduced configuration of the air filter apparatus that is volumetrically reduced relative to the expanded configuration, wherein the air filter material panel is foldable along multiple flexible inserts to reduce the physical dimensions of the air filter apparatus.

2. The filter apparatus of claim 1, wherein, when the air filter apparatus is used in an HVAC system, the plurality of flexible seals maintain a seal with a housing of the HVAC system housing to prevent unfiltered air from getting by the air filter apparatus.

3. The filter apparatus of claim 1, wherein the air filter material panel does not suffer damage when the air filter apparatus is transitioned between the expanded configuration and the reduced configuration.

4. The filter apparatus of claim 1, wherein the flexible seals comprise at least one of cloth, woven matting, flexible plastic, neoprene, mylar, rubberized flexible material, and metal.

5. The filter apparatus of claim 1, wherein the flexible seals are connected to the exterior edges of the air filter material panel by a bonding material.

6. The air filter apparatus of claim 1, where the air filter material panel has folds along perpendicular axes concurrently to reduce the physical dimensions of the air filter.

7. The air filter apparatus of claim 1, wherein, in the reduced configuration, the air filter apparatus is no more than 15 inches long, no more than 12 inches high, and no more than 2 inches thick.

8. A method of making an air filter apparatus, the method comprising:
providing an air filter material panel having a plurality of exterior edges;
attaching, to each of the exterior edges of the air filter material panel, a respective one of a plurality flexible seals thereby forming a respective exterior edge of the air filter apparatus;
inserting, into each of the plurality of flexible seals, a respective one of a plurality flexible inserts; and
by flexing the flexible inserts, folding the air filter material panel along multiple non-parallel axes from an expanded configuration of the air filter apparatus ready for use in an HVAC system to a reduced configuration of the air filter apparatus that is volumetrically reduced relative to the expanded configuration.

9. The method of claim 8, wherein, when the air filter apparatus is used in an HVAC system, the plurality of flexible seals maintain a seal with a housing of the HVAC system housing to prevent unfiltered air from getting by the air filter apparatus.

10. The method of claim 8, wherein the air filter material panel does not suffer damage when transitioned between the expanded configuration and the reduced configuration.

11. The method of claim 8, wherein the flexible seals comprise at least one of cloth, woven matting, flexible plastic, neoprene, mylar, rubberized flexible material, and metal.

12. The method of claim 8, wherein attaching, to each of the exterior edges of the air filter material panel, a respective one of a plurality flexible seals comprises using a bonding material.

13. The method of claim 8, wherein folding the air filter material panel along multiple non-parallel axes comprises folding along perpendicular axes sequentially to reduce the physical dimensions of the air filter apparatus.

14. The method of claim 8, wherein, in the reduced configuration, the air filter apparatus is no more than 15 inches long, no more than 12 inches high, and no more than 2 inches thick.

15. The method of claim 8, wherein each flexible seal has a hollow interior in which a respective flexible insert is inserted.

16. A method of installing an air filter apparatus in an HVAC system, the method comprising:
receiving an air filter apparatus, the air filter apparatus comprising:
an air filter material panel having a plurality of exterior edges; and
a plurality of flexible seals each along a respective one of the exterior edges of the air filter material panel, wherein, by flexures of the flexible seals, the air filter material panel when received is folded along multiple non-parallel axes in a reduced configuration, and wherein each flexible seal has a hollow interior in which a respective flexible insert is inserted; and
transitioning the air filter apparatus from the reduced configuration to an expanded configuration ready for use in an HVAC system; and
installing the air filter apparatus in an HVAC system such that the plurality of flexible seals maintain a seal with a housing of the HVAC system to prevent unfiltered air from getting by the air filter apparatus.

17. The method of claim 16, the multiple non-parallel axes along which air filter material panel is folded when received comprise perpendicular axes.

18. The method of claim 16, wherein the flexible seals comprise at least one of cloth, woven matting, flexible plastic, neoprene, mylar, rubberized flexible material, and metal.

* * * * *